United States Patent
Naumann et al.

[11] Patent Number: 5,664,469
[45] Date of Patent: Sep. 9, 1997

[54] WHEELSET ALIGNING TECHNIQUE FOR WHEELSET TRUING MACHINERY AND WHEELSET ALIGNING DEVICE

[75] Inventors: Hans J. Naumann, Albany, N.Y.; Reinhard Robotta, Erlau, Germany; Gunter Schröter, Chemnitz, Germany; Volker Thomas, Einsiedel, Germany

[73] Assignee: Niles-Simmons Industrieanlagen GmbH, Chemnitz, Germany

[21] Appl. No.: 300,046

[22] Filed: Sep. 2, 1994

[30] Foreign Application Priority Data

Sep. 12, 1993 [DE] Germany ............... 43 30 811.2

[51] Int. Cl.$^6$ ........................................ B23B 5/32
[52] U.S. Cl. ...................... 82/111; 33/203.13; 82/104
[58] Field of Search .................. 82/104, 105; 33/203.1, 33/203.13, 203.15, 203.16, 203.18, 203.19; 451/258

[56] References Cited

U.S. PATENT DOCUMENTS

| | | | |
|---|---|---|---|
| 3,323,397 | 6/1967 | Ladoues et al. | 82/104 |
| 3,372,517 | 3/1968 | Sakabe et al. | 451/258 |
| 4,347,769 | 9/1982 | Dombrowski et al. | 82/104 |
| 5,105,547 | 4/1992 | Fujii | 33/203.1 |

FOREIGN PATENT DOCUMENTS

| | | |
|---|---|---|
| 0195891 | 1/1986 | European Pat. Off. |
| 0 380 919 | 1/1990 | European Pat. Off. |
| 85 09 180 | 3/1985 | Germany |
| 39 02 550 | 1/1989 | Germany |
| 1815689 | 7/1990 | Germany |

OTHER PUBLICATIONS

"Viarofect DRU Underfloor Wheelset Lathe" of Hoesch Maschinenfabrik Germany AG (protected by patents EP 195 891 and DE–GM 85 09 180).

*Primary Examiner*—Daniel W. Howell
*Assistant Examiner*—Kenneth J. Hansen
*Attorney, Agent, or Firm*—Heslin & Rothenberg, P.C.

[57] ABSTRACT

A technique for aligning a wheelset using a wheelset truing machine is disclosed. Using the technique, the wheelset may be aligned by roughly aligning the wheelset truing machine, placing each wheel of the wheelset on at least one roller, determining the distance of tread points on each wheel on the rollers relative to the center of revolution of each wheel by forming measurements and calculations, and coinciding the center of revolution of each wheel with the corresponding setpoint of the machine center. The measurement is taken of the periphery and of the concentricity error and a distance of the tread points determined by the triangulation principle. The technique includes a wheelset aligning device having a locating fixture for locating the wheelset, a measuring device including a-peripheral measuring instrument and a concentricity error measuring instrument, at least two rollers disposed to be swiveled in a x-y plane and to be traversed in a direction perpendicular to the x-y plane on the wheel side of the wheelset to evaluate a respective wheel measurement in the x-y plane by interacting with the wheel thus allowing for coincidence between the respective center of revolution of the wheel and the respective setpoint of the machine center.

16 Claims, 4 Drawing Sheets

WHEELSET ALIGNING TECHNIQUE FOR WHEELSET TRUING MACHINERY AND WHEELSET ALIGNING DEVICE

FIELD OF THE INVENTION

The wheelset aligning technique for wheelset truing machinery as well as the wheelset aligning device performing this process serve for aligning a center of revolution of rail-vehicle wheelsets with regard to machine center during the machining process mainly attributed to wear on a wheelset truing machine. The technique invented can be applied for underfloor and above-floor wheelset truing machines. The term "wheelset" used in this description implies any possible kind of wheelset.

BACKGROUND OF THE INVENTION

Two essential principles for alignment of wheelset and wheelset truing machine are generally known. In the first principle, the wheelset axle is assumed as basis e.g. center bore, axle centering chuck, centering at dimensionally suitable housing. The second principle is based upon the wheels located in supporting rollers provided in prismatic arrangement.

Upon alignment of wheelset with regard to the wheelset truing machine by means of supporting rollers as described in the leaflet "Variofect DRU Underfloor Wheelset Lathe" of Hoesch Maschinenfabrik Germany AG and protected by patents EP 195 891 and DE-GM 85 09 180, alignment can only be done in vertical plane due to the oblique position of vehicle with regard to the wheelset truing machine with the effect that only three out of four rollers are bearing on the two wheels of wheelset to be machined. Thus, the aligning effect of the prisms obtained by the two supporting rollers is lost. Being aware of this, additional live center points for centering the wheelset at the center bores of wheelset axle were proposed in the example of DE-PS 39 02 550 and EP 380 919.

Alignment on the basis of center bores of wheelset is shown in the leaflets of the company Simmons Machine Tool Corp. An ideal solution for alignment of wheelset and wheelset truing machine in two planes is introduced here in a quite ideal way. However, the necessity of clearing the center bores has a disadvantageous effect.

SUMMARY OF THE INVENTION

The invention includes a wheelset aligning technique and a wheelset aligning device ensuring alignment even of an excessively dislocated wheelset until coincidence of real center of revolution with the respective setpoint of machine center without clearing the center bores, relevant mounting and dismounting efforts, risks of contamination and warranty loss and without roughing the profile.

The problem to be solved by the invention is to propose a wheelset aligning technique for wheelset truing machines as well as a wheelset aligning device ensuring alignment of the center of revolution of the wheels of a wheelset with regard to the appertaining setpoints of machine center prior to machining after measuring the wheels and the consequent calculation of the center of revolution.

The aforementioned problem may be solved by using the wheelset aligning technique in accordance with the present invention. The invention involves a process for aligning the wheelset using a wheelset truing machine including roughly aligning the wheelset to be machined on a wheelset truing machine, placing each wheel of the wheelset on at least one roller, determining the distance of tread points of each wheel on the at least one roller relative to the center of revolution of each wheel by measurement and calculation, and coinciding the center of revolution of each wheel with a corresponding setpoint of machine center.

A wheelset aligning device useable in this technique includes a locating fixture for locating the wheelset with regard to a truing machine, a measuring device including a peripheral measuring instrument and a concentricity error measuring instrument disposed on a wheel side of the wheelset, at least two rollers located to be swiveled along an x-y plane and to be traversed in a direction parallel to the x-y plane on the wheel side of the wheelset to evaluate a respective wheel measurement in the x-y plane by interacting with the wheel thereby allowing for the center of revolution of the wheel to coincide with a corresponding setpoint of machine center.

The measurement of each wheel may be performed isochronously or non-isochronously. Determining the center of revolution of the wheels may be accomplished by using a triangulation principle. The measuring device may be adapted as a listing supporting a driving device for the wheelset. The peripheral measuring instrument may be designed with a roller.

BRIEF DESCRIPTION OF THE DRAWINGS

In the detailed description when read in conjunction with the following drawings, the invention will be explained in detail by means of a preferred but illustrative example of execution.

DESCRIPTION OF THE PREFERRED EMBODIMENTS

Figure 1:
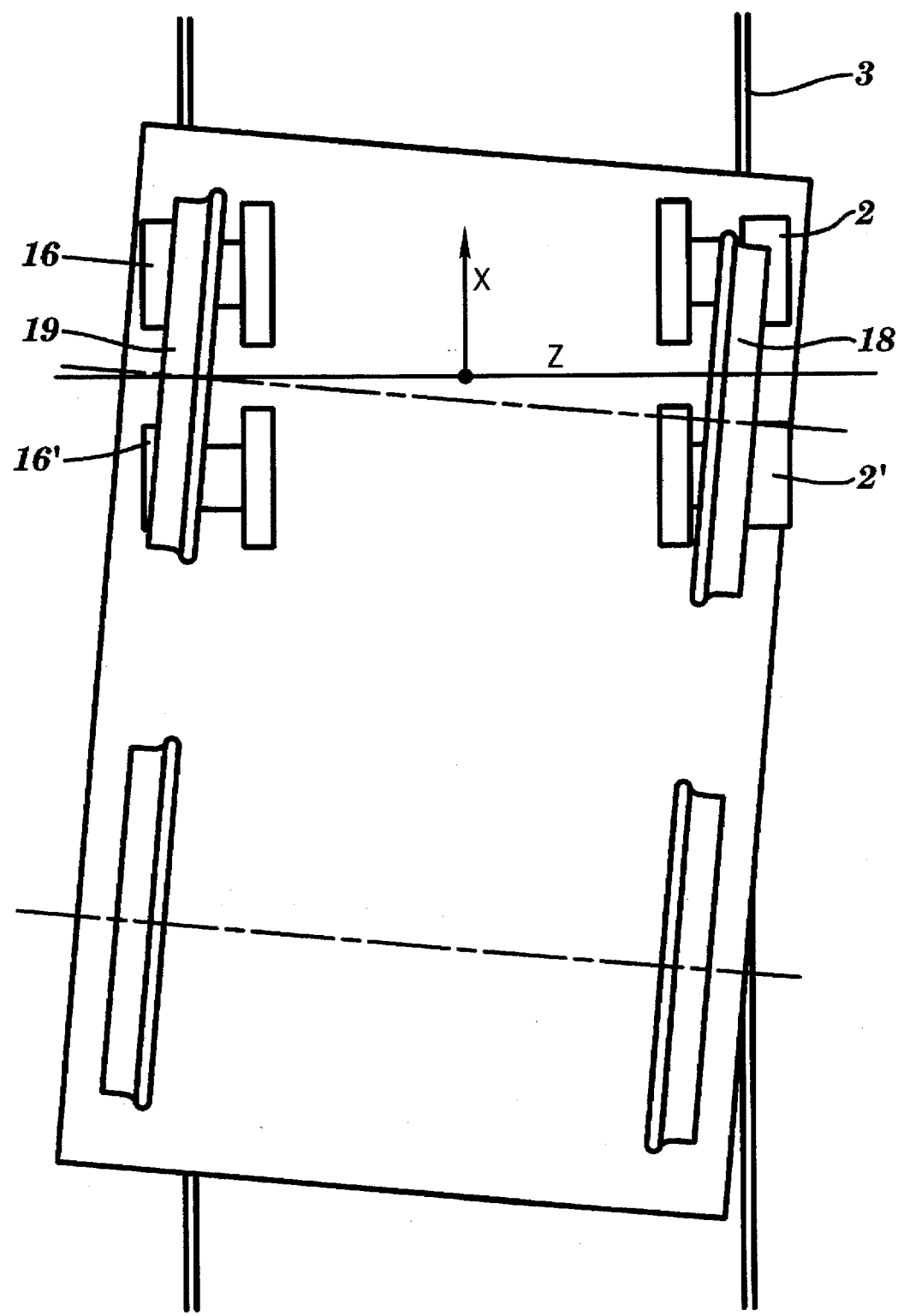
FIG. 1 Schematic representation of a truck of vehicle car introduced in the wheelset truing machine FIG. 2 Schematic representation of a wheelset FIG. 3 Schematic representation of wheelset aligning technique as well as of the means of wheelset aligning device applied for alignment on one wheel FIG. 4 Diagram periphery/rotation angle FIG. 5 Diagram radius/rotation angle
Figure 2:
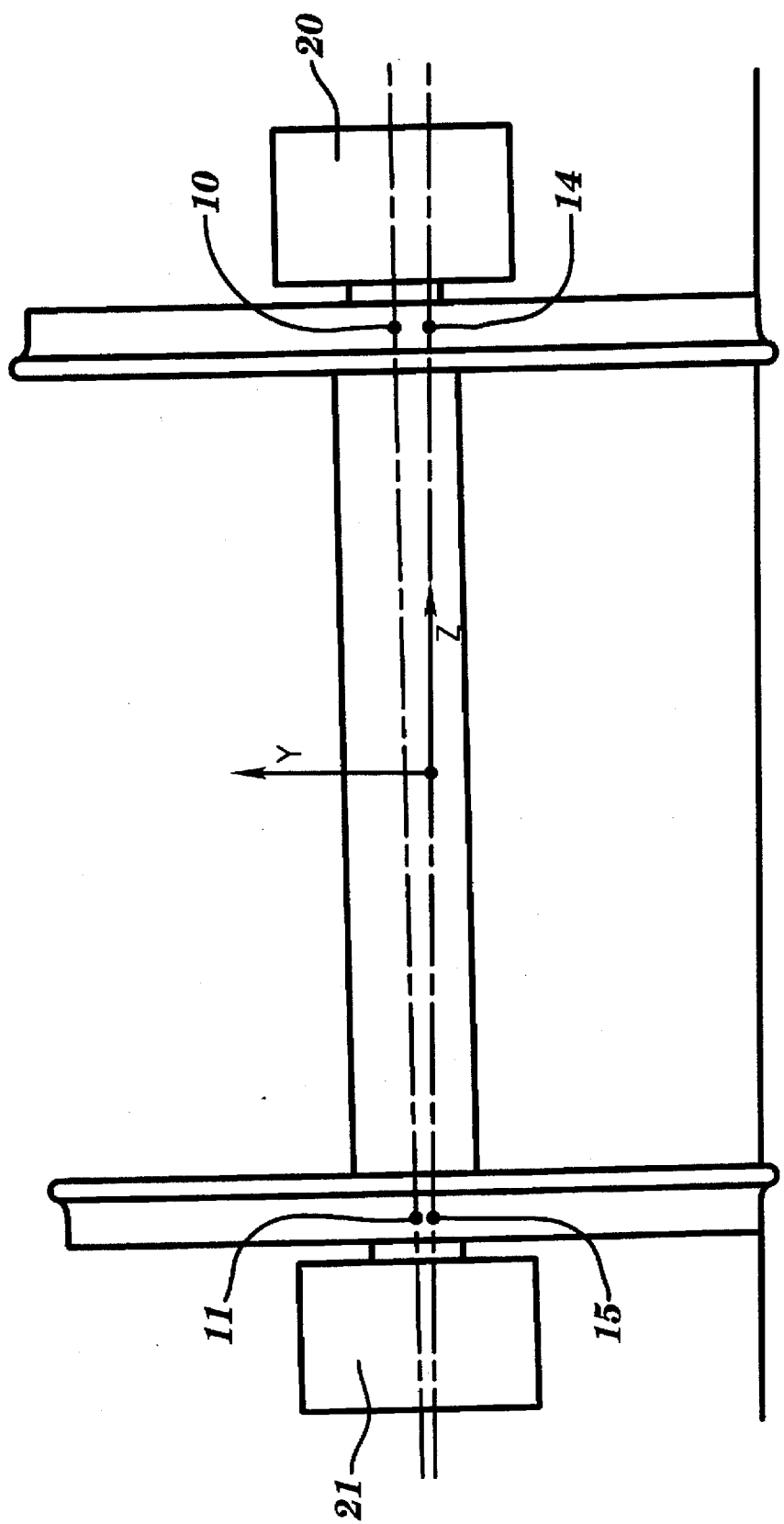
Figure 3:
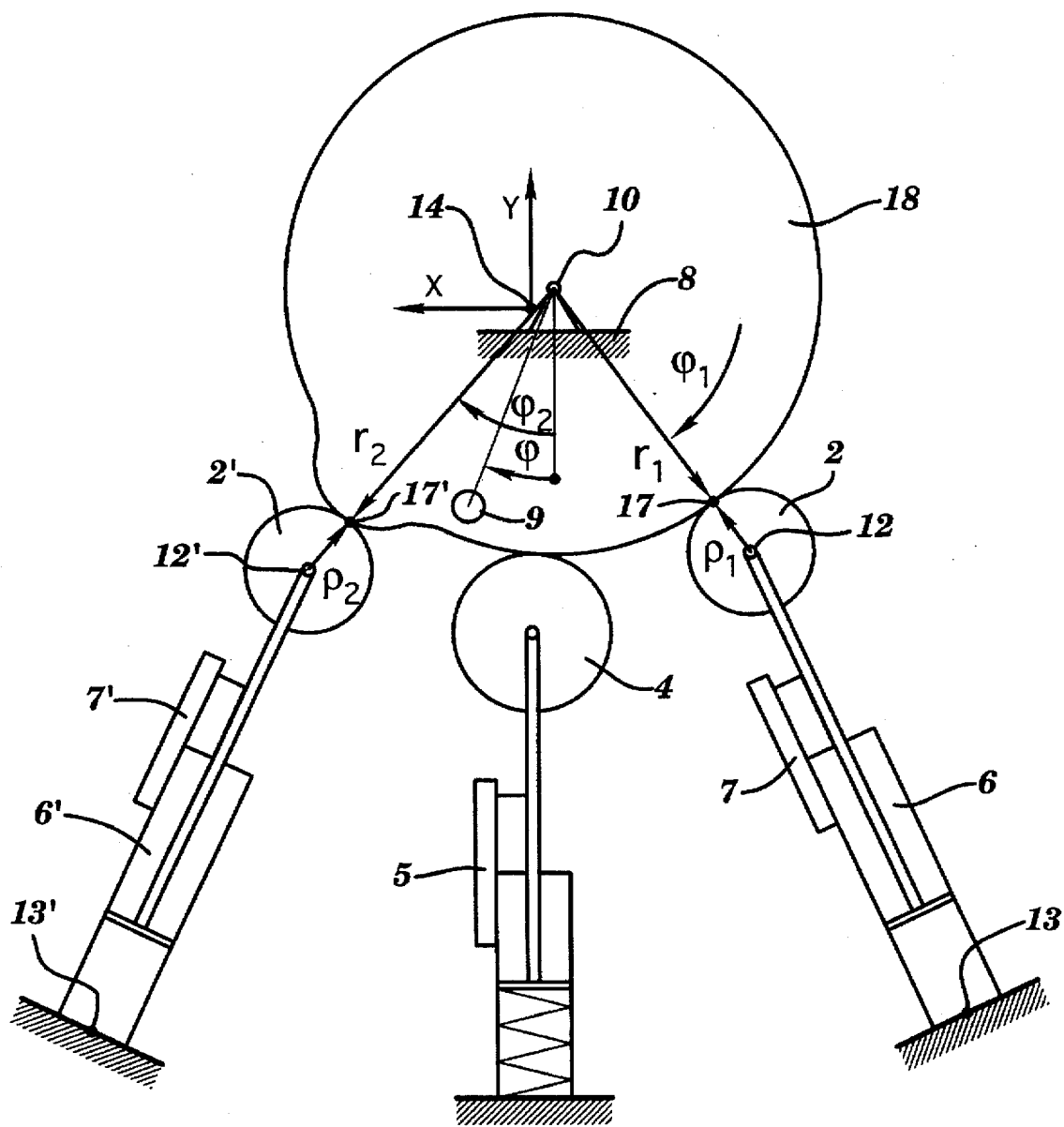

The following reference symbols were chosen:
1 wheelset
2 roller
2' roller
3 track
4 measuring instrument for periphery
5 measuring instrument for concentricity error
6 lifting device
6' lifting device
7 path measuring device
7' path measuring device
8 mechanical block
9 mark
10 center of revolution of wheel
11 center of revolution of wheel
12 roller center
12' roller center
13 base point of triangulation
13' base point of triangulation
14 setpoint of machine center
15 setpoint of machine center
16 roller
16' roller
17 tread point 17' tread point
18 wheel
19 wheel
20 housing
21 housing A wheelset is placed within a wheelset truing machine of usual design with symmetrical lifting, driving, fixing and machining devices. The wheelset 1 is then only roughly aligned to the horizontal plane (x-z plane) and the vertical plane (y-z plane) due to the gage play and constraining forces of the rail vehicle when running along the rails as well as the differences in shape and diameter of the wheels caused by different wear of each wheel. This is shown in FIGS. 1 and 2. The wheels 18 and 19 of wheelset 1 to be aligned are relieved in a known manner by any suitable lifting device and lifted by a definite amount off the track 3 or any other feeding attachment ensuring the aligning procedure. These lifting devices are arranged preferably but not necessarily using supporting roller pairs 2 and 2' and 16 and 16' acting on the wheels. Among these rollers 2, 2', 16 and 16', at least one roller is preferably but not necessarily designed as a driving roller. Any other possible drive is also suitable for purposes of this invention. Then, the two housing 20 and 21 of the wheelset 1 are fixed in at least the y-z plane using any known locating means or locating procedures. Fixing the housings 20, 21 in this location can be achieved, for example, by means of a mechanical block 8 as shown in FIG. 3. Now, the wheelset 1 may perform at least one measuring revolution by means of the one or more rollers acting as previously mentioned. In this example, for counting the number of revolutions, a mark 9 is applied on at least one of the wheels 18, 19. Either wheel 18, 19 is measured during this measuring revolution by means of known measuring procedures and measuring devices.

Figure 4:
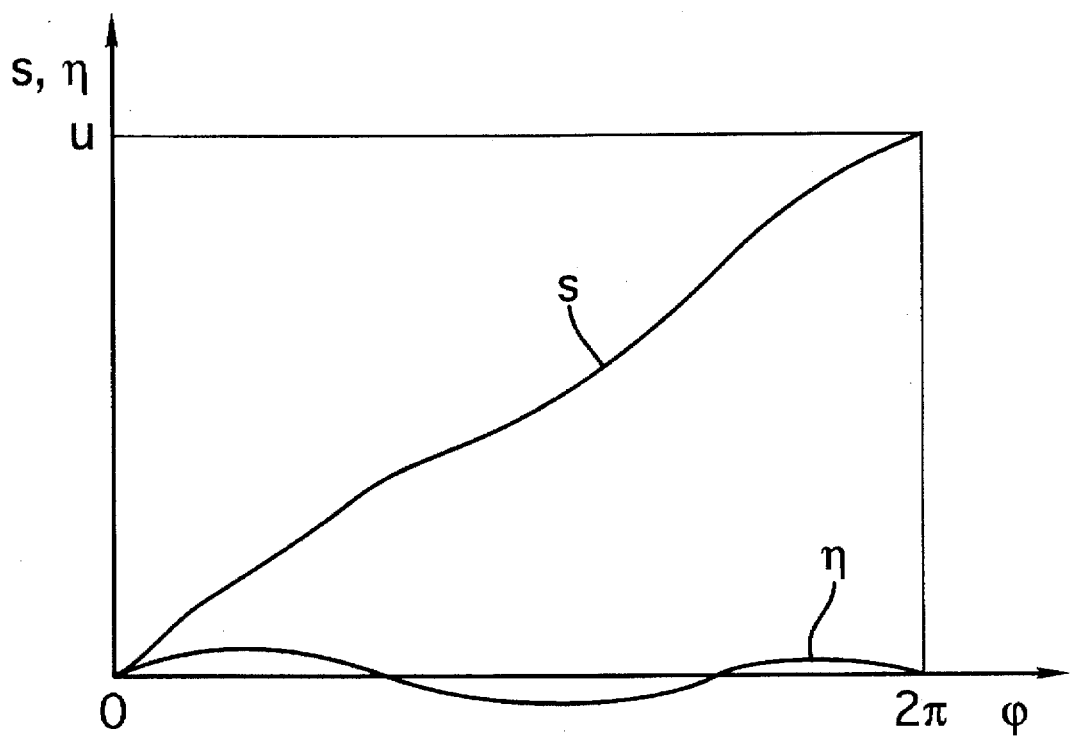
Figure 5:
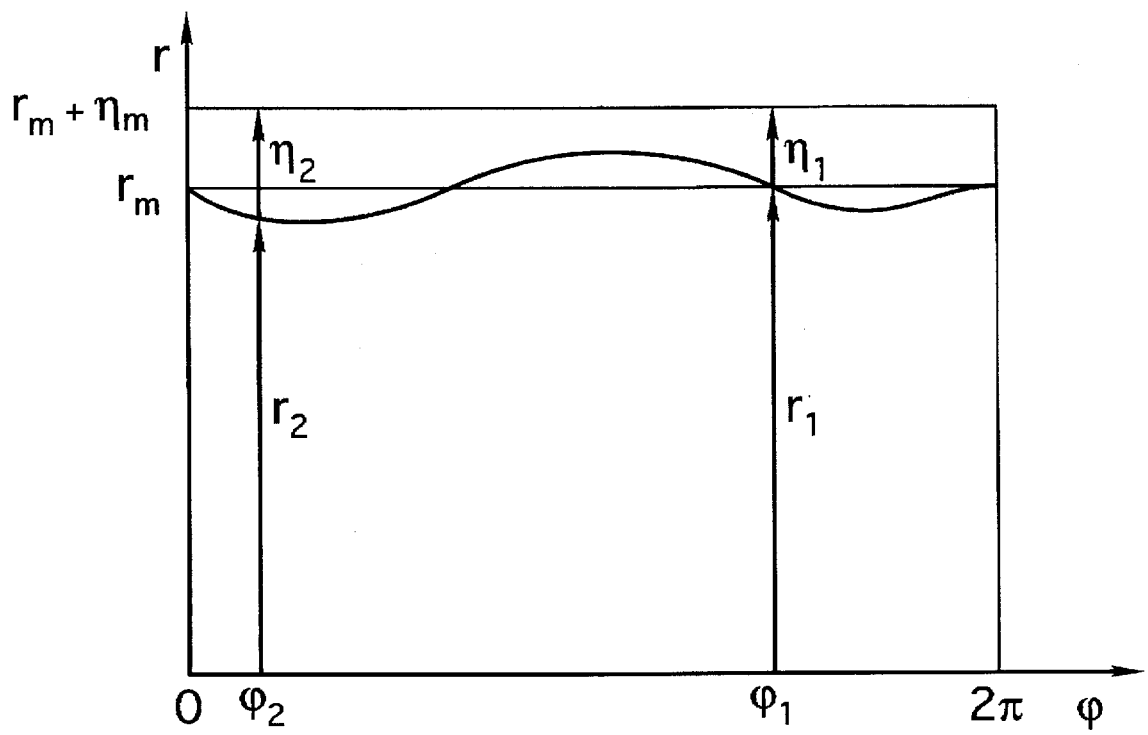

The periphery of the wheel 18, 19 is preferably, but not necessarily, measured by means of a periphery measuring instrument 4 via tread paths and, by means of a concentricity error measuring instrument. The concentricity error eta is measured via rotation angle phi. This type of mechanical measurement is given here for example, to be taken preferably between rollers 2, 2' and 16, 16' as shown in FIG. 3. The variable radius r over the rotation angle phi is determined arithmetically from the measurements of the periphery and the concentricity error for each wheel 18, 19 at all possible tread points 17, 17' as shown in FIGS. 4 and 5. Using the path measuring devices 7, 7' arranged between the movable rollers 2, 2' and 16, 16' and the lifting devices 6, 6' traversing them in radial direction, the position of the respective center of revolution of the wheel 10 and the center of rotation of wheel 11 can be determined by triangulation according to the position of tread points 17, 17' on the periphery of either wheel 18, 19, the resulting radii r1 (phi 1) and r2 (phi 2), the known base points 13, 13' and the position of roller centers 12, 12' including the roller radii rho 1 and rho 2. The lifting device 6, 6', e.g. lifting cylinders or electrical drives on either side of wheelset aligning device, shall now be adjusted so that the center of revolution of wheel 10 coincides with the setpoint of machine center 14 and the center of revolution of wheel 11 to the setpoint of machine center 15. When the triangulation proves that the erroneous position of the wheelset 1 in the plane z-x is such that a three-point rest is only obtained during correction of erroneous position by means of lifting device 6, 6' on either side, the vehicle or truck will be set in parallel to track 3 by shifting the appertaining rollers 2, 2' and 16, 16' in z-direction. Now, the aligning procedure can be carried out as described above. During the aligning procedure, the contact of each roller 2, 2' and 16, 16' with the wheels 18, 19 is sustained by monitoring the force in the lifting devices 6, 6'.

We claim:

1. A process for aligning a wheelset using a wheelset truing machine comprising:
   roughly aligning a wheelset (1) to be machined on a wheelset truing machine;
   placing each wheel (18, 19) of the wheelset on at least one roller (2, 2', 16, 16"), said at least one roller being disposed to be swivelled in an x-y plane and moveable in a direction perpendicular to said x-y plane;
   determining the distance of tread points (17, 17") of each wheel (18, 19) on the at least one roller (2, 2', 16, 16") relative to the center of revolution of each wheel (10, 11) by measurement of one or more periphery and concentricity error, and calculation; and
   coinciding the center of revolution of each wheel (10, 11) with a corresponding setpoint of machine center (14, 15).

2. The process according to claim 1, wherein said measurement of each wheel is performed isochronously.

3. The process according to claims 1 or 3 further comprising determining the centers of revolution of each wheel (10, 11) of said wheelset (1) by applying a triangulation principle.

4. The process according to claim 3 further comprising lifting, supporting and driving said wheelset.

5. The process according to claim 4 wherein said measurement and calculation comprises measuring concentricity error.

6. The process according to claim 5 further comprising measuring the path length of the periphery of a wheel of said wheelset.

7. The process to claim 6 wherein measuring the path length is performed using a roller.

8. The process according to claim 1 wherein said measurement is performed non-isochronously.

9. The process according to claim 8 wherein said measurement comprises a periphery and concentricity measurement.

10. The process according to claim 1 wherein said measurement comprises a periphery measurement and a concentricity measurement.

11. A wheelset aligning device comprising:
   a locating fixture for locating the wheelset with regard to a truing machine;
   a measuring device including at least one of a peripheral measuring instrument (4) and a concentricity error measuring instrument (5), disposed on a wheel side of said wheelset;
   at least two rollers, each (2, 2'/16, 16') disposed to be swivelled in an x-y plane and to be traversed in a direction perpendicular to said plane on said wheel side of said wheelset to evaluate a respective wheel measurement in said x-y plane by interacting with the wheel thus allowing for a center of revolution of said wheel to coincide with (10, 11) and a corresponding setpoint of machine center (14, 15).

12. The wheelset aligning device according to claim 11, characterized by said measuring device being adapted as a lifting, supporting and driving device for said wheelset and wherein said peripheral measuring instrument is designed with a roller.

13. The wheelset aligning device according to claims 11 or 12 wherein said arrangement of at least two rollers comprises a path measuring device operatively engaged to one of said two rollers and adapted to measure the path length of the periphery of said wheel.

14. The wheelset aligning device according to claims 11 or 12 further comprising a second measuring device disposed on a second side of said wheelset and a second arrangement of at least two rollers disposed on said second side of said wheelset.

15. The wheelset aligning device according to claims 11 or 12 wherein said arrangement of at least two rollers comprises a path measuring device operatively engaged to one of said two rollers and adapted to measure the path length of the periphery of said wheel.

16. A wheelset aligning process comprising:

locating a wheelset on a truing machine;

measuring one or more of a periphery and concentricity error of a wheel of the wheelset;

supporting the wheel on at least two rollers, each disposed to be swivelled in a x-y plane and moveable in a direction perpendicular to said x-y plane on the wheel of the wheelset;

measuring the wheel in the x-y plane; and coinciding a center of revolution of the wheel and the corresponding setpoint of machine center.

\* \* \* \* \*